(12) United States Patent
Hoek et al.

(10) Patent No.: US 11,990,742 B2
(45) Date of Patent: May 21, 2024

(54) SECUREMENT MEMBER FOR UTILITY STRANDS

(71) Applicant: Hubbell Incorporated, Shelton, CT (US)

(72) Inventors: Matthew Hoek, Centralia, MO (US); Heidi Sims, Centralia, MO (US)

(73) Assignee: Hubbell Incorporated, Shelton, CT (US)

(*) Notice: Subject to any disclaimer, the term of this patent is extended or adjusted under 35 U.S.C. 154(b) by 287 days.

(21) Appl. No.: 17/602,619

(22) PCT Filed: Apr. 8, 2020

(86) PCT No.: PCT/US2020/027234
§ 371 (c)(1),
(2) Date: Oct. 8, 2021

(87) PCT Pub. No.: WO2020/210335
PCT Pub. Date: Oct. 15, 2020

(65) Prior Publication Data
US 2022/0200259 A1 Jun. 23, 2022

Related U.S. Application Data

(60) Provisional application No. 62/830,852, filed on Apr. 8, 2019.

(51) Int. Cl.
*H02G 7/10* (2006.01)
*F16L 3/137* (2006.01)

(52) U.S. Cl.
CPC ............... *H02G 7/10* (2013.01); *F16L 3/137* (2013.01)

(58) Field of Classification Search
None
See application file for complete search history.

(56) References Cited

U.S. PATENT DOCUMENTS

| | | | | |
|---|---|---|---|---|
| 3,173,638 A | * | 3/1965 | Neale, Sr. | H02G 7/10 174/41 |
| 4,882,813 A | * | 11/1989 | Nakamura | B65D 63/16 24/17 AP |
| 9,958,089 B2 | * | 5/2018 | Geiger | F16L 3/137 |
| 11,174,083 B1 | * | 11/2021 | Rivero | B65D 63/16 |
| 2001/0025399 A1 | * | 10/2001 | Rohaly | B65D 63/16 24/30.5 R |

FOREIGN PATENT DOCUMENTS

CN 105020475 8/2017

OTHER PUBLICATIONS

PCT/US2020/027234 International Search Report and Written Opinion dated Aug. 6, 2020 (14 pages).

* cited by examiner

*Primary Examiner* — Krystal Robinson
(74) *Attorney, Agent, or Firm* — Robinson + Cole LLP

(57) ABSTRACT

A securement member for connecting strands includes a main body. A first aperture, a second aperture, and a third aperture extend through the main body. A fastener is coupled to the main body and is positioned adjacent to the first aperture. A strap is selectively received within the first aperture, the second aperture, and the third aperture in order to secure the strands to the main body. The fastener engages the strap to secure the strap relative to the main body.

20 Claims, 7 Drawing Sheets

SECUREMENT MEMBER FOR UTILITY STRANDS

BACKGROUND

The present disclosure relates to a securement member for utility strands along aerial transmission lines.

Utility transmission lines are used to route utility connections over large distances. For example, overhead communications lines (e.g., fiber optic lines) utilize conductor strands strung along towers and poles to provide data and communication connections over long distances to residential locations. Other utilities, such as telephone and power lines can be routed in similar fashion.

One way to route utility lines is to string messenger strands along poles on a transmission route. The messenger strands can be made from a stronger, more durable material (e.g. braided steel) than typical communication strands, and are therefore used to support the communication lines in overhead transmissions. Accordingly, there is a need to be able to efficiently secure communication strands to messenger strands in a durable manner.

SUMMARY

In one aspect, a securement member for connecting cables includes a main body and a strap. A first aperture, a second aperture, and a third aperture extend through the main body. A fastener is coupled to the main body and is positioned adjacent to the first aperture. A strap is selectively received within the first aperture, the second aperture, and the third aperture in order to secure the cables to the main body. The clip engages the strap to secure the strap relative to the main body.

In another aspect, a securement member for connecting cables includes a main body with a first aperture, a second aperture, and a third aperture. Each of the first aperture, the second aperture, and the third aperture extend parallel to a body axis. The second aperture is spaced apart from the first aperture. The third aperture is spaced apart from the first aperture and the third aperture. A first clip is coupled to the main body and is biased into the first aperture. A strap is selectively receivable within the first aperture, the second aperture, and the third aperture in order to secure the cable to the main body. The clip engages the strap to secure the strap relative to the main body.

Another aspect is directed to method of securing a communication strand to a messenger strand. A securement member is positioned proximate a messenger strand. The securement member includes a main body and a strap. The main boding includes a first aperture extending through the main body, a second aperture extending through the main body, a fastener extending into the second aperture, an upper portion, and a lower portion. The securement member is positioned so the messenger strand is adjacent the upper portion and a communication strand is adjacent the lower portion. The strap is extended around one of the communication strand or the messenger strand. The strap is extended through the first aperture. The strap is extended around the other of the communication strand or the messenger strand. The strap is extended through the second aperture to engage the strap with the fastener to secure the strap relative to the main body.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

In general, the present disclosure relates to a spacer and a tie for retaining cables in addition to spacing cables apart. Adapters may couple to the spacers to increase the spacing between the cables.

Figure 1:
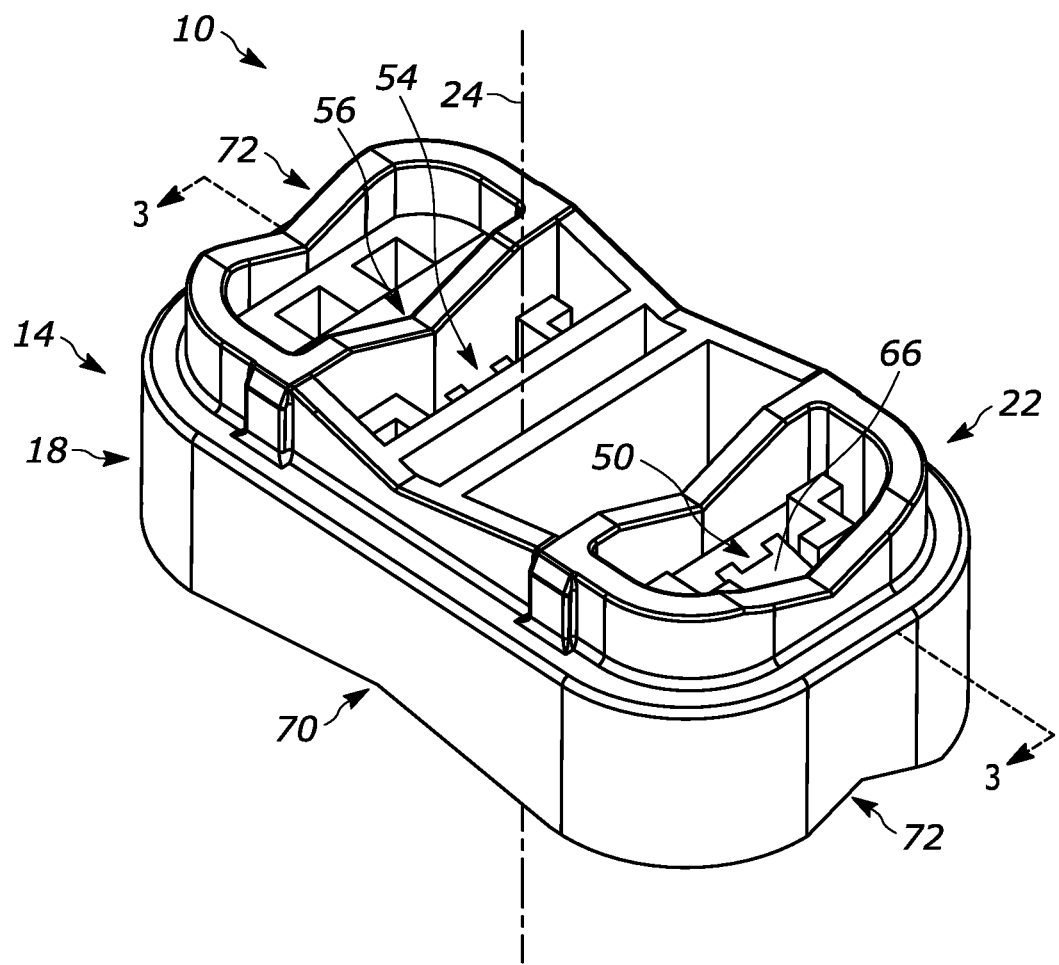
FIG. 1 is a perspective view of a securement member.

As shown in FIG. 1, the securement member or cable spacer 10 includes a main body 14. In the illustrated embodiment, the cable spacer 10 is a molded part. The main body 14 has a first portion 18 and a second portion 22. The first portion 18 and the second portion 22 are formed integrally with one another. The first portion 18 and the second portion 22 are also aligned along a body axis 24. In the illustrated embodiment, the first portion 18 and the second portion 22 have a rectangular profile.

Figure 2:
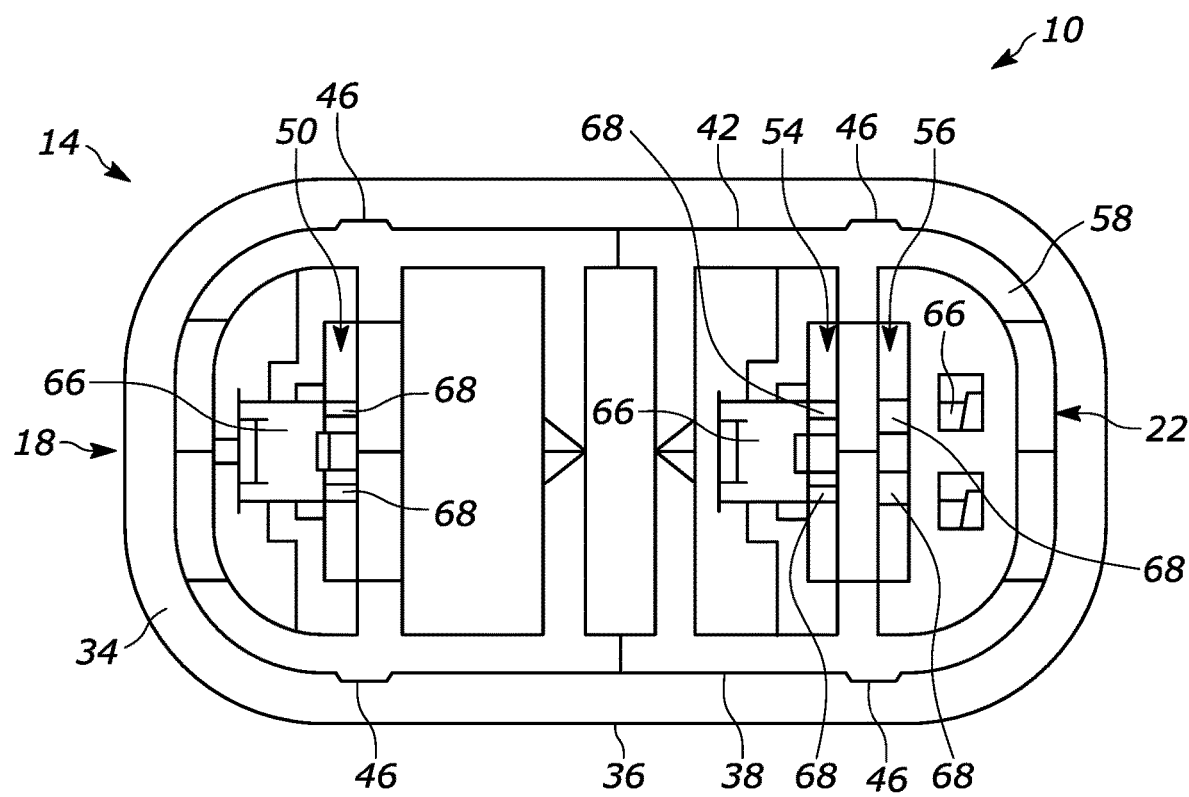
FIG. 2 is a top view of the securement member of FIG. 1.
Figure 3:
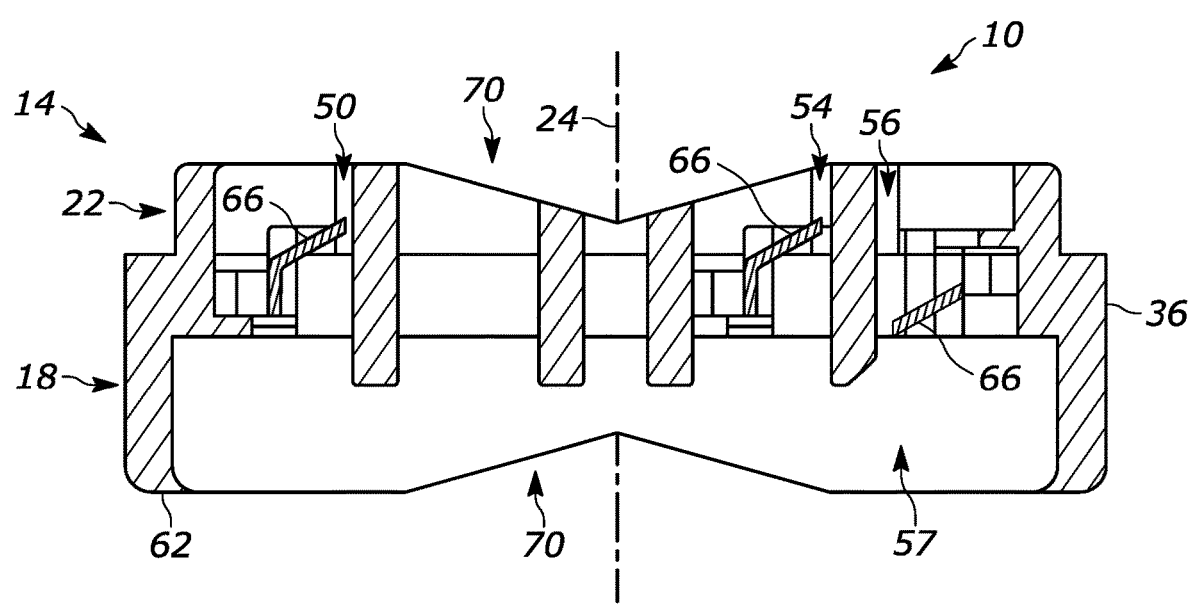
FIG. 3 is a cross-sectional view of the securement member of FIG. 1 taken along line 3-3.

As shown in FIGS. 2 and 3, the first portion 18 has a first surface or upper surface 34 and a second or side surface 36. The upper surface 34 is orthogonal to the side surface 36. The second portion 22 extends from the upper surface 34. The first portion 18 has a width greater than a width of the second portion 22 so that the upper surface 34 extends past the second portion. The intersection of the first portion 18 and the second portion 22 along the upper surface 34 forms a stepped surface. The stepped surface 34 is perpendicular to the body axis 24. In the illustrated embodiment, the upper surface 34 is symmetrically aligned along perpendicular planes extending through the body axis 24 (FIG. 3).

The second portion 22 includes a first side 38 and a second side 42 opposite the first side 38. The first side 38 of the second portion 22 is positioned proximate the side surface 36 of the first portion 18. Both the side surface 36 and the first side 38 are adjacent the upper surface 34. The first side 38 and second side 42 are parallel to the side surface 36 and the body axis 24. Projections 46 also extend from the upper surface 34 and are adjacent to the first and second sides 38, 42 of the second portion 22. In the illustrated embodiment, the second portion 22 includes four projections 46 (FIG. 2). The projections 46 are spaced apart along the first side 38 and the second side 42 of the second portion 22. In the illustrated embodiment, two projections 46 are located on the first side 38 of the second portion 22 and two projections 46 are located on the second side 42 of the second portion 22. The projections 46 on the first side 38 are symmetric the projections 46 on the second side 42. In some embodiments, the projections 46 may be tapered.

FIG. 2 also illustrates a first aperture 50, a second aperture 54, and a third aperture 56. Each aperture 50, 54, 56 extends partially between the first side 38 and the second side 42. In the illustrated embodiment, the first, second, and third apertures 50, 54, 56 have a rectangular opening. Additionally, the second aperture 54 is disposed between the first aperture 50 and the third aperture 56. The second aperture 54 is also disposed closer to the third aperture 56 than the first aperture 50.

As shown in FIG. 3, the first aperture 50, the second aperture 54, and the third aperture 56 extend between the first portion 18 and a first or upper surface 58 of the second portion 22. The first portion 18 is hollow and defines a cavity 57. The apertures 50, 54, 56 each extend into the cavity 57. In the illustrated embodiment, each aperture 50, 54, 56 has approximately the same width, and are each parallel to the body axis 24.

One or more fasteners are coupled to the main 14 positioned proximate or extending into one or more respective apertures 50, 54, 56. In some embodiments, the fasteners are clips 66 coupled to the main body 14, and include prongs or teeth 68 (e.g., two teeth 68 per clip 66). One clip 66 is positioned proximate the first aperture 50, one clip 66 is positioned proximate the second aperture 54, and one clip 66 is positioned proximate the third aperture 56. Each clip 66 is coupled to the first portion 18 of the main body 14 and extends into the respective aperture 50, 54, 56. In the illustrated embodiment, the clip 66 proximate the first aperture 50 and the clip 66 proximate the second aperture 54 extend toward the second portion 22. The clip 66 proximate the third aperture 56 extends away from the second portion 22 (e.g., toward a lower surface 62 of the first portion 18). In some embodiments, the clips 66 are press fit into a surface of the first portion 18.

The clips 66 can be angled (e.g., each includes a bend) with respect to the apertures 50, 54, 56 (i.e., the clips 66 form an oblique angle with respect to the body axis 24).

Each clip 66 forms substantially the same angle with respect to the body axis 24. The clips 66 are biased into the respective aperture 50, 54, 56 and are allowed to flex independently of one another in order to change their angle with respect to the body axis 24. The clips 66 can extend in a cantilevered fashion into the respective aperture 50, 54, 56. In the illustrated embodiment, the clips 66 are formed from a different material than the main body 14 (e.g., the main body 14 may be a plastic molded part and the clips 66 may be metal). Metal can help the clips 66 maintain bias to remain within the respective aperture 50, 54, 56 over a longer life cycle.

With reference to FIG. 1, the lower surface 62 of the first portion 18 and the upper surface 58 of the second portion 22 have a first interior grooved portion 70 and a second interior grooved portion 72. The first grooved portions 70 are disposed proximate the first and second sides 38, 42 (e.g., the shorter width of the main body 14). The second grooved portions 72 are oriented approximately 90° to the first grooved portions 70 (e.g., the longer width of the main body 14). In the illustrated embodiment, the first and second grooved portions 70, 72 are V-shaped. The first and second grooved portions 70, 72 are also arranged in a double-concave orientation. In other words, openings of the first and second grooved portions 70, 72 are adjacent to the lower surface 62 or upper surface 58 respectively, and the first and second grooved portions 70, 72 curve toward a middle of the main body 14. In the illustrated embodiment, centers of the first grooved portions 70 and the second grooved portions 72 are aligned along the body axis 24.

Figure 4:
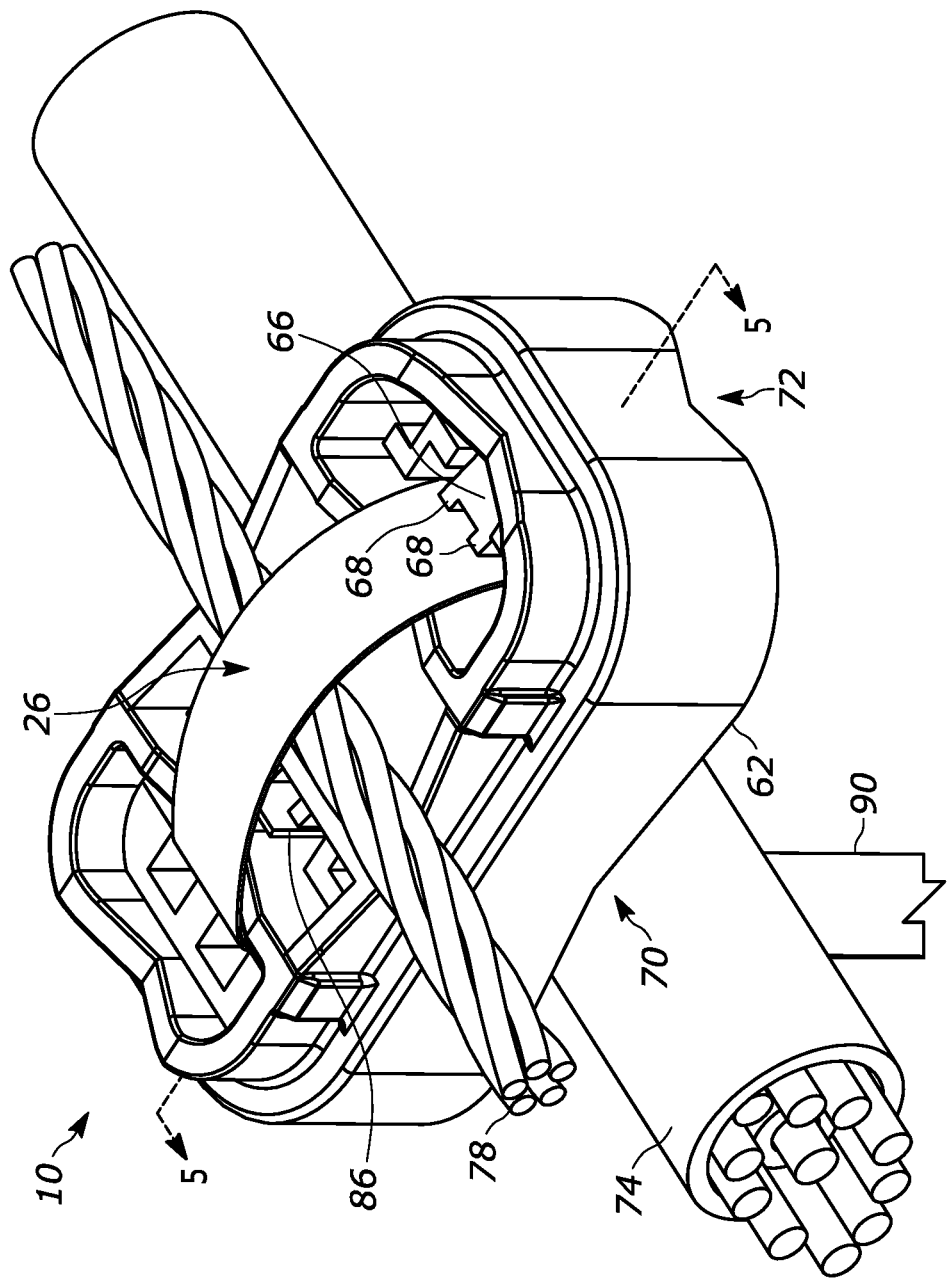
FIG. 4 is a perspective view of the securement member of FIG. 1 coupled to a first cable and a second cable.

As shown in FIG. 4, the cable spacer 10 also includes a tie or strap 26 that can be separate from the main body 14 (i.e., the main body 14 and the strap 26 are formed as two pieces). The length of the strap 26 is substantially greater than any dimension associated with the main body 14. Additionally, a width of the strap 26 is less than a width of any of the apertures 50, 54, 56.

The cable spacer 10 may couple to a first cable or strand 74 and a second cable or strand 78. In the illustrated embodiment, the first strand 74 is a fiber optic cable while the second strand 78 is a messenger cable. In other embodiments the strands can be different utility lines (e.g., telephone lines, power lines, etc.). The strand 74 and the messenger strand 78 are each receivable within one of the grooved portions 70 (e.g., along the smaller width of the main body 14). The grooved portions 70 provide a surface for the strands 74, 78 to rest on. In other embodiments, the first and second stands 74, 78 may be low voltage electrical conductors, or any other type of cable that transports an electrical current.

Figure 5:
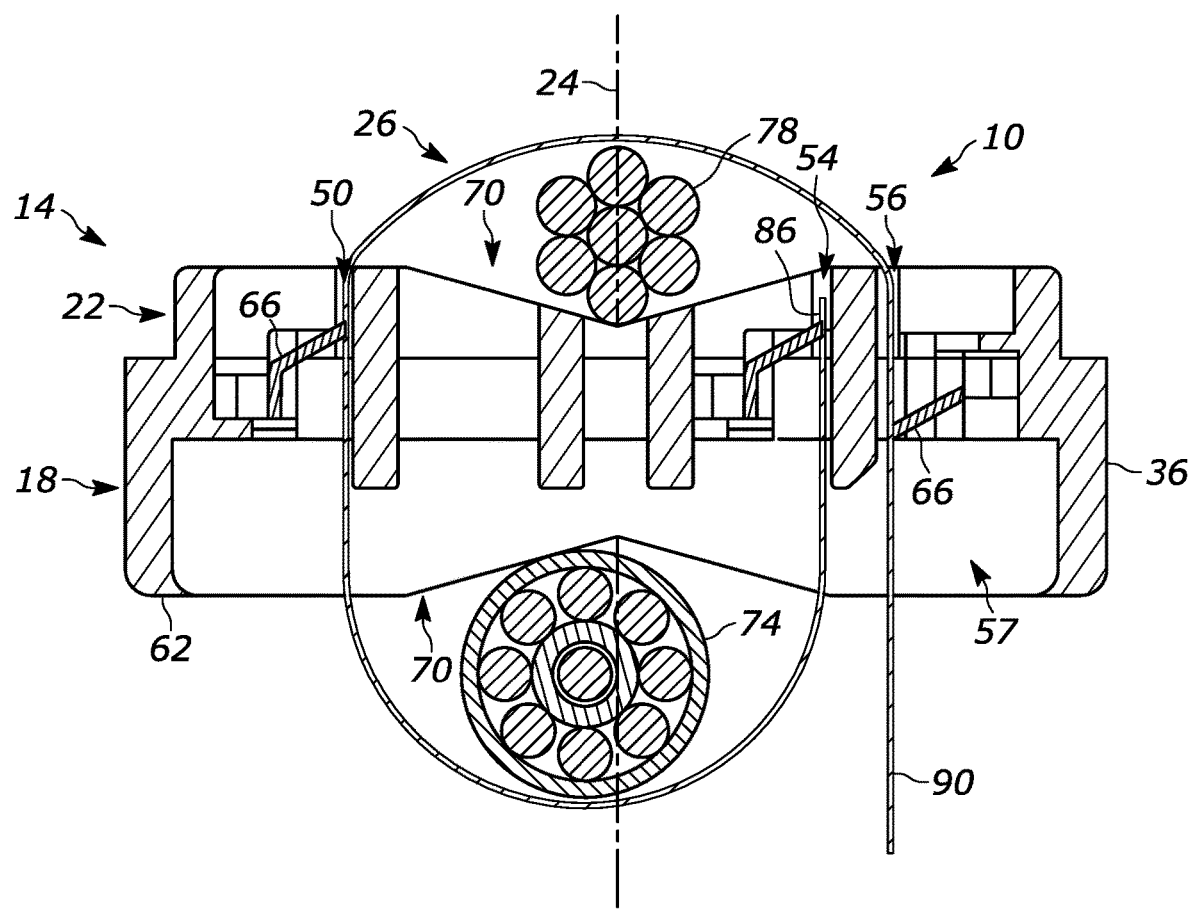
FIG. 5 is a cross-sectional view of the securement member of FIG. 4, taken along line 5-5.

As shown in FIG. 5, to secure the strands 74, 78 to the main body 14, the strap 26 is inserted through the second aperture 54. In the illustrated embodiment, a first end 86 of the strap 26 is inserted through the second aperture 54 (e.g., from the lower surface 62 toward the upper surface 58) so that a portion of the strap extends beyond the second aperture 54. The clip 66 is biased into the second aperture 54 in order to contact the strap 26, and the teeth 68 on the clip 66 secure (e.g., dig into) the strap 26 in the second aperture 54 by limiting reverse movement (i.e., pulling the strap 26 out of the second aperture from the upper surface 58 toward the lower surface 62). The strap 26 can include a set of teeth (not shown) on one or more sides. The teeth can include small projections (e.g., ridges, corrugations, etc.) that extend perpendicular to the body of the strap or angled in a certain direction.

Next, the second end 90 of the strap 26 wraps around the first strand 74 and extends into the first aperture 50 (e.g., from the lower surface 62 toward the upper surface 58) so that a portion of the strap extends beyond the first aperture 50. Pulling the strap 26 tight through the first aperture 50 couples the first strand 74 against the grooved portion 70 proximate the lower surface 62. The clip 66 proximate the first aperture 50 acts in a similar manner as the clip 66 proximate the second aperture 54 and secures (e.g., digs into) the strap 26 within the first aperture 50, and limits movement in the reverse direction.

The strap 26 then passes over the second messenger strand 78 and through the third aperture 56. The clip 66 proximate the third aperture 56 is oriented opposite the other clips 66 because the strap 26 is inserted in the opposite direction (i.e., from the upper surface 58 toward the lower surface 62). As the strap 26 passes through the third aperture 56, the teeth 68 of the clip 66 proximate the third aperture 56 engage the teeth of the strap 26. Pulling the strap 26 tight through the third aperture 56 also pulls the strap 26 tight through the first and second apertures 50, 54. This resists the first and second strands 74, 78 from translating along the body axis 24. In some embodiments, a portion of the strap 26 has a width larger than a width of the first aperture 50 and prevents the strap 26 from being pulled completely through the first aperture 50 when the strap 26 is being pulled tight.

According to some aspects, the fasteners will be provided in fewer than all of the apertures 50, 54, 56. For example, a clip 66 can be provided for only two of the apertures 50, 54, 56, for example the second aperture 54 and the third aperture 56. Other embodiments can include only one fastener. For example, the first end 86 of the strap 26 can be integrally formed with or otherwise to secured to the main body 14, and a fastener can be used in only the third aperture 56 to secure the second end 90 of the strap 26.

Figure 6:
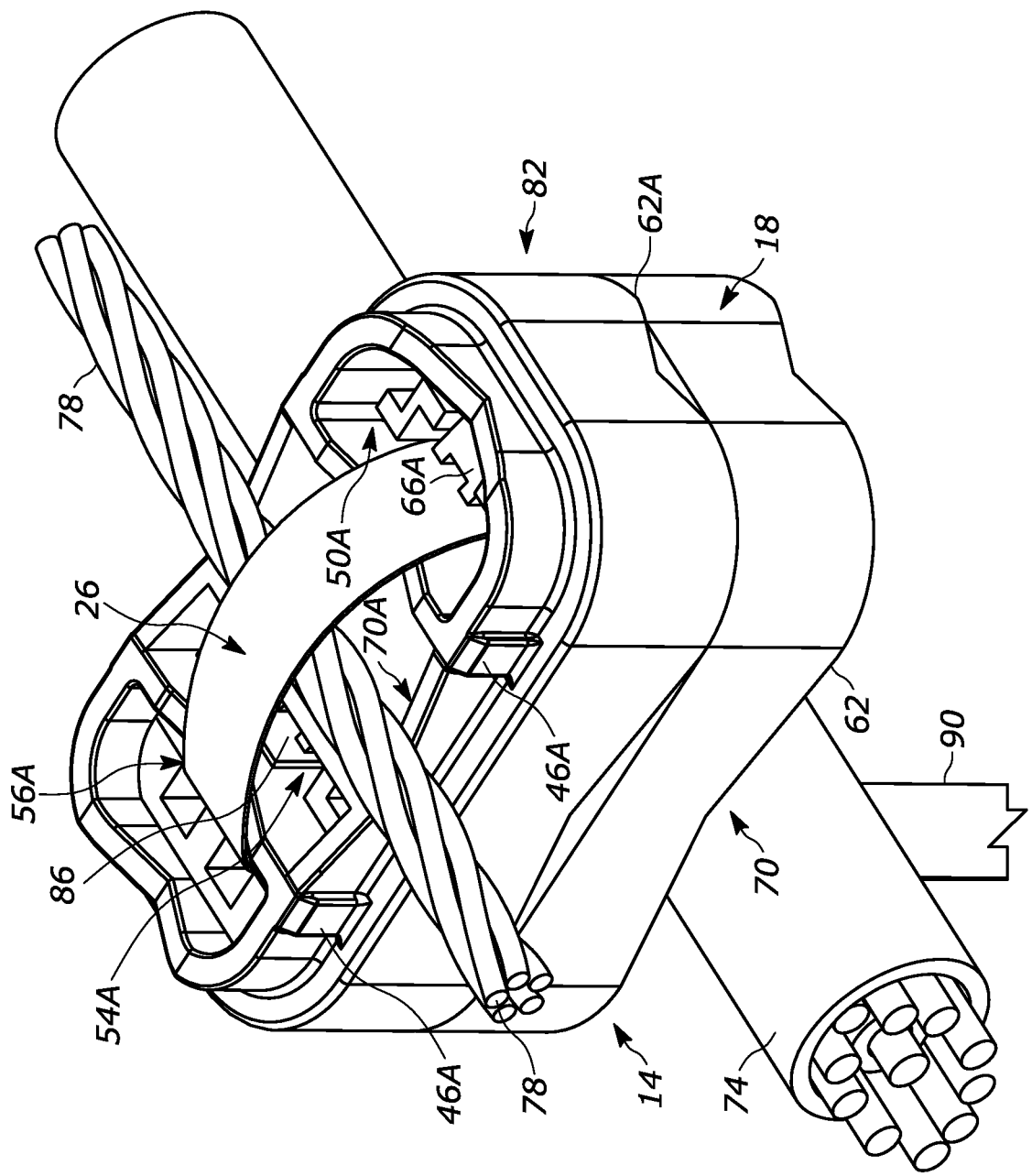
FIG. 6 is a perspective view of the securement member of FIG. 5 further coupled to a spacer to increase the distance between the first cable and the second cable.

As shown in FIG. 6, an adapter 82 may couple to the main body 14. The adapter can be positioned proximate the upper surface 34 of the first portion 18 or proximate the lower surface 62 of the first portion 18 in order to provide additional spacing between the first strand 74 and the second messenger strand 78. The adapter 82 is shaped substantially similar to the main body 14 of the cable spacer 10. Common elements have the same reference number "A".

The similar shape between the adapter 82 and the main body 14 allows the adapter 82 to stack on top of the main body 14. The adapter 82 is positioned such that a lower surface 62A of the adapter abuts with the upper surface 34 (see e.g., FIG. 2) of the first portion 18. Additionally, the adapter 82 has slots (not shown) on an inner surface that complements the projections 46 of the main body 14. The slots receive the projections 46 as the adapter 82 is coupled to the main body 14. Receiving the projections 46 within the slots provides a snap fit between the adapter 82 and the main body 14.

In the illustrated embodiment, the apertures 50A, 54A are wider than the apertures 50, 54, 56. The first aperture 50A of the adapter 82 aligns with the first aperture 50 of the main body 14 and the second aperture 54A of the adapter 82 aligns the second and third apertures 54, 56 of the main body 14. The strap 26 passes through each first aperture 50, 50A and each second aperture 54, 54A in order to couple the first strand 74 to the main body 14. The increased width of the aperture 54A allows the strap 26 to extend back through the second aperture 54A of the adapter 82 when extending through the third aperture 56 of the main body 14 (e.g., the width of the second aperture 54A can receive at least two times the thickness of the strap 26). The adapter 82 may also include a grooved portion 70A to provide a surface for the messenger strand 78 to rest on. In the illustrated embodiment, the adapter 82 includes clips 66A in each of the apertures 50A, 54A, 56A. In other embodiments, the adapter 82 may not include any clips, or my only include clips in some of the apertures 50A, 54A, 56A.

The adapter 82 also includes projections 46A. The projections 46A allow the adapter 82 to couple to another adapter (not shown) in the same manner in which the adapter 82 coupled to the main body 14. Connecting additional adapters 82 allows a user to further increase the spacing between strands 74, 78. The length of the strap 26 relative to the main body 14 allows the strap to wrap around and secure the strands 74, 78 when numerous adapters 82 are coupled to the main body.

In certain embodiments, the adapter 82 is substantially identical to the cable spacer. In other words, a second cable spacer 10 may be used in a similar manner as an adapter 82 and stacked directly on top of a first cable spacer 10 or an adapter 82. For example, the second portion 22 of the spacer 10 or adapter 82 is configured to mate with the first portion 18. The projections 46 are configured to mate with accommodating depressions in the first portion 18 to align the spacers 10 and/or adapters 82. Further the cable spacer 10, as well as the adapter 82, may have different heights in order to provide different spacing arrangements between strands. Additionally, the length of the strap 26 may vary in alternate embodiments to allow for greater or fewer adapters 82, or cable spacers 10, to secure to the main body 14.

Figure 7:
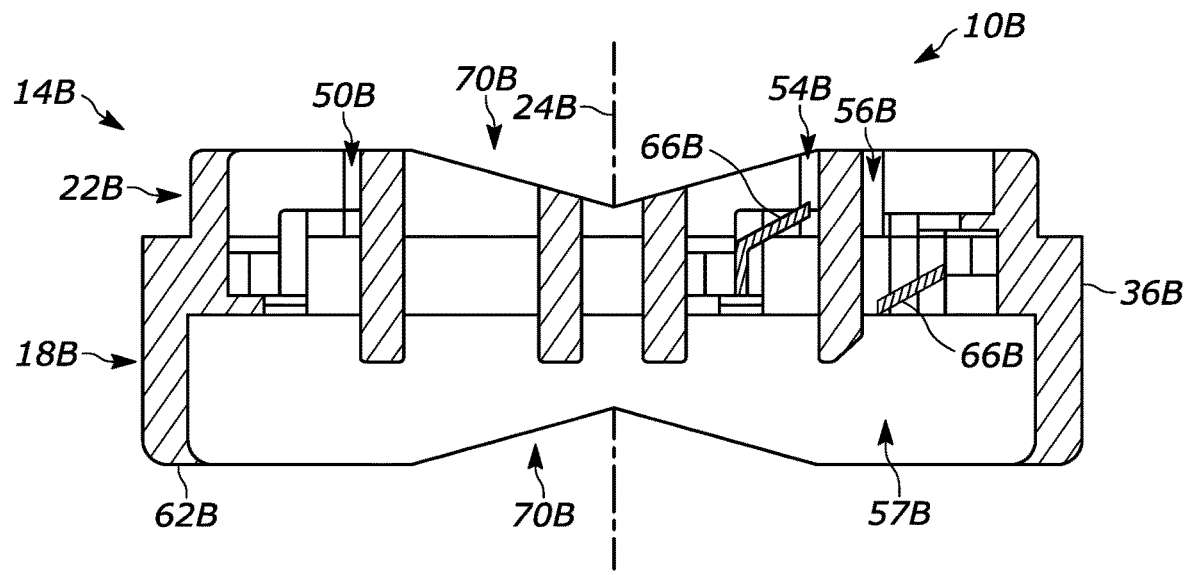
FIG. 7 is a cross-sectional view of a securement member of another embodiment.

As shown in FIG. 7, an alternate embodiment of the cable spacer 10B includes one clip 66B positioned proximate the second aperture 54B, and one clip 66B positioned proximate the third aperture 56B. The cable spacer 10B does not include a clip proximate the first aperture 50B. In the illustrated embodiment, a first end 86 of the strap 26 (see e.g., FIG. 5) is inserted through the second aperture 54B (e.g., from the lower surface 62B toward the upper surface 58B), and the teeth (see e.g., FIG. 2) on the clip 66B secure (e.g., dig into) the strap 26 in the second aperture 54B. Next, the second end 90 of the strap 26 wraps around the first strand 74 (see e.g., FIG. 5) and extends into the first aperture 50B (e.g., from the lower surface 62B toward the upper surface 58B) so that a portion of the strap 26 extends beyond the first aperture 50B. Pulling the strap 26 tight through the first aperture 50B couples the first strand 74 against the grooved portion 70B proximate the lower surface 62B. The strap 26 then passes over the second strand 78 and through the third aperture 56B. The clip 66B proximate the third aperture 56B is oriented opposite the clip 66B proximate the second aperture 54B because the strap 26 is inserted in the opposite direction (i.e., from the upper surface 58B toward the lower surface 62B). As the strap 26 passes through the third aperture 56B, the teeth of the clip 66B proximate the third aperture 56B engage the strap 26. Pulling the strap 26 tight through the third aperture 56B also pulls the strap 26 tight through the first and second apertures 50B, 54B. This resists the first and second strands 74, 78 from translating along the body axis 24B.

Figure 8:
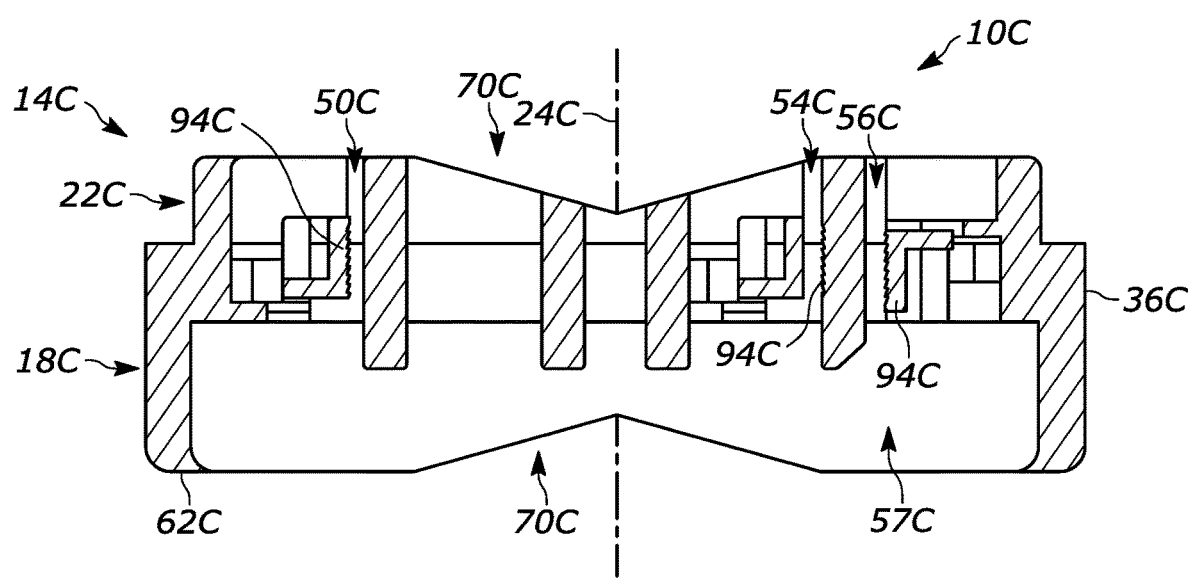
FIG. 8 is a cross-sectional view of a securement member of another embodiment.

As shown in FIG. 8, an additional alternate embodiment of a cable spacer 10C the fastener includes a projection 94C having a set of teeth in each of the apertures 50C, 54C, 56C. Although in other embodiments, the projection 94C may be in only some of the apertures 50C, 54C, 56C. A strap 26 (see e.g., FIG. 5) may include teeth (not shown) which engage with the teeth of the projection 94C. The strap 26 couples to the body in substantially the same way as described with respect to the cable spacer 10. In the illustrated embodiment, the strap 26 and projection 94C engage in a zip-tie fashion. The teeth of the projection 94C can be formed as different sizes and shapes (e.g., rectilinear corrugations, angled points, etc.).

Any embodiment of the cable spacer 10, 10A, 10B may be used on communication lines or in similar applications. In the illustrated embodiment, the cable spacer 10 is black in order to provide protection from ultraviolet (UV) radiation.

Although aspects have been described in detail with reference to certain preferred embodiments, variations and modifications exist within the scope of one or more independent aspects as described.

What is claimed is:

1. A securement member for utility transmission strands, the securement member comprising:
   a main body having a first grooved portion configured to receive a utility strand and a second grooved portion configured to receive a utility strand, wherein the first grooved portion is oriented orthogonal to the second grooved portion;
   a first aperture extending through the main body;
   a second aperture extending through the main body;
   a third aperture extending through the main body;
   a fastener coupled to the main body and positioned adjacent to the first aperture; and
   a strap selectively receivable within the first aperture, the second aperture, and the third aperture in order to secure strands to the main body, the fastener engaging the strap to secure the strap relative to the main body.

2. The securement member of claim 1, wherein the fastener is made from a first material and the main body is formed from a second material that is different than the first material.

3. The securement member of claim 2, wherein the fastener includes metal.

4. The securement member of claim 1, wherein the fastener is a clip.

5. The securement member of claim 1, wherein the main body includes a grooved portion extending across the main body, wherein the grooved portion is positioned between the first aperture and the second aperture, and wherein the grooved portion is configured to receive a utility strand.

6. The securement member of claim 1, wherein the first grooved portion is formed integrally with the second grooved portion.

7. The securement member of claim 1, wherein the fastener is a first clip, the securement member further comprising a second clip positioned adjacent the second aperture, and a third clip positioned adjacent the third aperture.

8. The securement member of claim 7, wherein the first clip extends from the main body in a first direction and the second clip extends from the main body in a second direction opposite the first direction.

9. The securement member of claim 1, wherein the fastener is angled obliquely with respect to the first aperture and cantilevered into the first aperture.

10. The securement member of claim 1, wherein the fastener is a projection having a set of teeth.

11. A securement member for strands, the securement member comprising:
    a main body including a first aperture extending parallel to a body axis, a second aperture spaced apart from the first aperture and extending parallel to the body axis, and a third aperture spaced apart from the first aperture and the second aperture and extending parallel to the body axis;
    a first clip coupled to the main body and biased into the first aperture; and
    a strap formed separately from the main body and selectively receivable within the first aperture, the second aperture, and the third aperture in order to secure strands to the main body, the clip engaging the strap to secure the strap relative to the main body,
    wherein each of the first aperture, the second aperture, and the third aperture are configured to allow the strap to extend through the main body.

12. The securement member of claim 11, further comprising, a second clip coupled to the main body and biased into the second aperture, and a third clip coupled to the main body and biased into the third aperture.

13. The securement member of claim 12, wherein the first clip and the second clip extend toward an upper surface of the main body, and the third clip extends toward a lower surface of the main body.

14. The securement member of claim 12, wherein the first clip, the second clip, and the third clip have substantially the same angle relative to the body axis.

15. The securement member of claim 11, wherein the first clip further includes teeth configured to engage the strap, the teeth allowing the strap to move in a first direction through the first aperture and limiting movement of the strap in a second direction, opposite the first direction.

16. The securement member of claim 11, wherein the first clip is made from a different material than the main body.

17. The securement member of claim 11, wherein the main body further includes a first portion, a second portion, and a stepped surface positioned between the first portion and the second portion, the securement member further comprising,
    an adapter configured to abut the stepped surface, the adapter shaped similarly to the main body and including a first aperture configured to align with the first aperture of the main body and a second aperture configured to align with the second aperture and the third aperture of the main body.

18. A method of securing a communication strand to a messenger strand comprising:
    positioning a securement member proximate a messenger strand, the securement member including a main body and a strap, the main boding including a first aperture extending through the main body, a second aperture extending through the main body, a third aperture extending through the main body, a first fastener extending into the second aperture, a second fastener extending into the third aperture, an upper portion, and a lower portion;
    positioning the securement member so the messenger strand is adjacent the upper portion and a communication strand is adjacent the lower portion;
    extending the strap around one of the communication strand or the messenger strand;
    extending the strap through the first aperture;
    extending the strap around the other of the communication strand or the messenger strand;
    extending the strap through the second aperture to engage the strap with the fastener to secure the strap relative to the main body; and
    extending a first end of the strap into the third aperture to engage the strap with the second fastener.

19. The method of claim 18, wherein the main body includes a third fastener extending into the first aperture, and further comprising extending a second end of the strap into the first aperture to engage the strap with the third fastener.

20. The method of claim 18, wherein the upper portion includes a first groove receiving the messenger strand and the lower portion includes a second groove receiving the communication strand.

\* \* \* \* \*